United States Patent [19]

Millard

[11] Patent Number: 5,272,381
[45] Date of Patent: Dec. 21, 1993

[54] COMMON MODE FILTERED MAGNETIC CONNECTOR

[75] Inventor: Steven J. Millard, New Cumberland, Pa.

[73] Assignee: The Whitaker Corporation, Wilmington, Del.

[21] Appl. No.: 686,909

[22] Filed: Apr. 16, 1991

[51] Int. Cl.⁵ .......................... H02J 3/00; H01P 5/12
[52] U.S. Cl. ..................................... 307/17; 333/100; 333/119; 307/19
[58] Field of Search ................ 307/17, 19, 83, 104, 307/105, 16; 333/100, 12, 119, 131, 100; 363/47; 336/175; 323/250, 331

[56] References Cited

U.S. PATENT DOCUMENTS 4,264,827  4/1981  Herzog ................................. 307/17
5,077,543  12/1991 Carlile ................................. 333/177

*Primary Examiner*—A. D. Pellinen
*Assistant Examiner*—Aditya Krishnan

[57] ABSTRACT

The present invention involves a connector for inductively coupling to a multi-wire data bus utilizing a magnetic core and associated coil for inducing signals upon the bus and for sensing such signals on the bus. The connector includes a pair of magnetic members disposed on either side of the magnetic core for attenuating common mode energy generated within the connector at about the same frequency as that of the primary signal appearing on the data bus.

5 Claims, 4 Drawing Sheets

COMMON MODE FILTERED MAGNETIC CONNECTOR

The present invention relates to a connector for magnetically coupling to a data bus in a data transmission system where the data bus carries differential mode signals.

The type of data transmission system of interest here is that which utilizes a multi wire bus having differentially generated signals imposed thereon commonly known as a current mode data bus. Such a data transmission system is disclosed in U.S. Pat. No. 4,264,827 which issued to Herzog on Apr. 28, 1981 and is hereby incorporated by reference as though set forth verbatim herein. The '827 patent discloses a multi-wire bus, one embodiment being a two wire twisted pair arrangement. A magnetic core, being of C or E shape and having an I section for closing the magnetic path, is shown inductively coupled to the two wire bus. The magnetic core includes a separate winding which is used to either sense a signal appearing on the bus or to induce a signal on the bus. A connector for inductively coupling to such a current mode data bus is disclosed in U.S. Pat. No. 5,105,095, a continuation of patent application Ser. No.07/576,341 now abandoned which was filed on Aug. 31, 1990 and assigned to the assignee of the present application. The '095 patent, which is incorporated by reference as though set forth verbatim herein, discloses a two part connector housing containing an E shaped magnetic core in each housing half. When the two housing halves are mated, the two E shaped cores also mate to provide a continuous magnetic path through all three of its legs. The two wire twisted pair bus is spread apart a slight amount at the point where the connector is to be inductively coupled, one wire being placed on each side of the center leg of the E shaped core in one of the connector halves. When the two halves are mated an individual continuous magnetic path is provided which substantially surrounds each wire.

A heretofore unknown problem associated with such inductively coupled connectors is that common mode energy is sometimes introduced to the data bus during the very process of inducing a signal onto the bus within the connector itself. This common mode energy is then free to propagate along the bus where it may radiate from the bus and interfere with other nearby electronic equipment. It is known in the art to utilize ferrite beads around data transmission lines to attenuate unwanted signals which were inadvertently impressed upon the line by electrical equipment associated with the line or by radiation from outside sources. However, these uses of ferrite beads are always directed to attenuating energy at a frequency other than the frequency of the primary signal being transmitted along the line. Otherwise, the primary signal would be attenuated as well, an undesirable result. However, the common mode energy in the present case is unique in that it occurs at the same frequency as the primary signal as will be explained in further detail below. What is needed is a connector which tends to reduce this type of common mode energy within the connector itself without adversely affecting the primary signal on the data bus.

SUMMARY OF THE INVENTION

The present invention is a connector for magnetically coupling to a multi-wire data bus which reduces common mode energy of the type that is induced on the bus during the process of inducing the signal thereon. The connector is magnetically coupled to the bus for differentially inducing signals on the bus and for sensing signals on the bus. Induction means is provided in coupling relation with the bus for inducing and sensing the signals. Attenuation means is provided in coupling relation with the bus for operating on only common mode energy induced on the bus by the induction means.

DESCRIPTION OF THE PREFERRED EMBODIMENT

Figure 1:
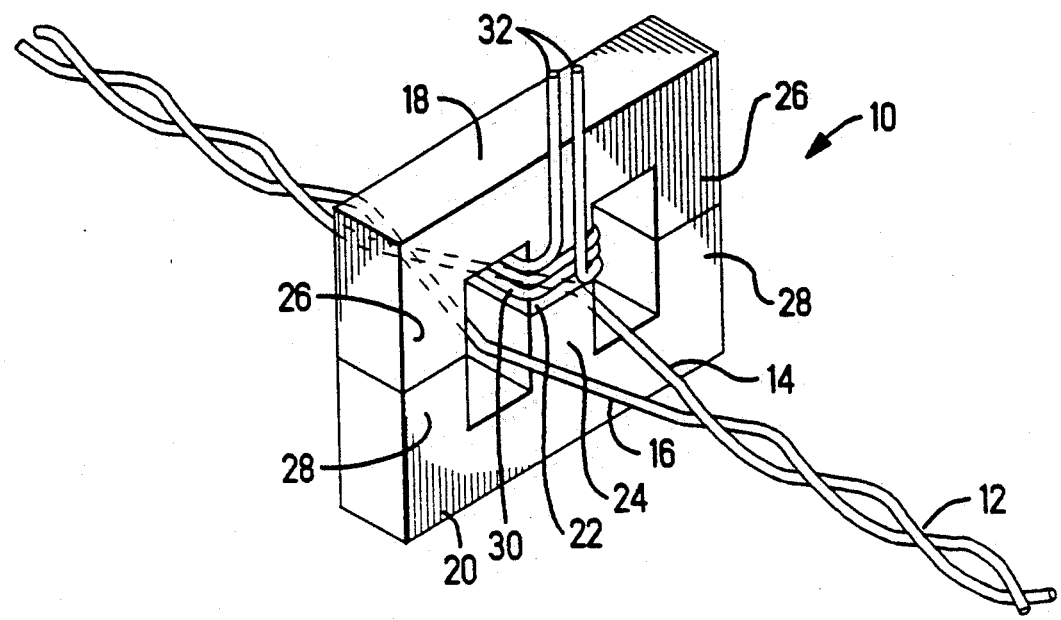
FIG. 1 is an isometric view of a prior art inductive coupling to a two wire bus.

There is shown in FIG. 1 a typical magnetic core 10 magnetically coupled to a two wire bus 12 having first and second wires 14 and 16 respectively. In the present example the two wires 14 and 16 are twisted to form a two wire twisted pair bus. The magnetic core 10, in the present example, is composed of two E shaped halves 18 and 20 each of which have a center leg 22 and 24 respectively and a pair of outside legs 26 and 28 respectively. The two wires 14 and 16 are spread apart slightly so that they straddle the center leg 24 as shown. A coil 30 is arranged around the center leg 22 and includes a pair of leads 32. As is shown, the two E shaped halves 18 and 20 are arranged in abutting relationship so that they form a separate magnetic path around each of the wires 14 and 16.

Figure 2:
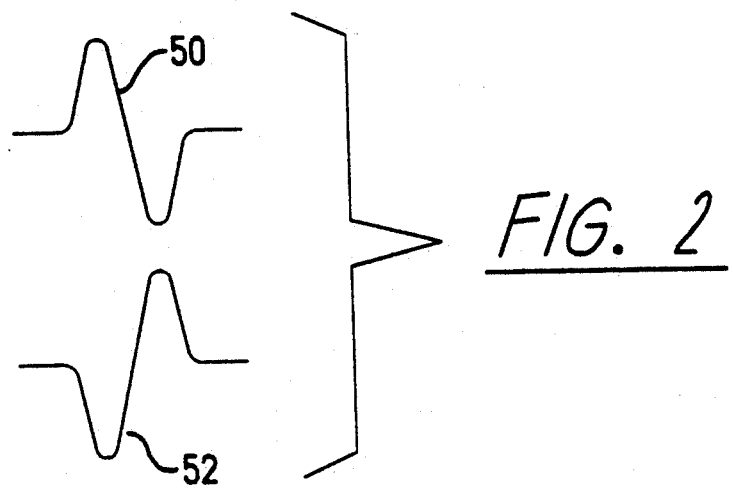
FIG. 2 is a graph depicting typical waveforms of a differential signal as it appears on each wire of a two wire bus.
Figure 3:
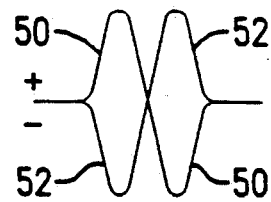
FIG. 3 is a graph depicting the combined waveforms of the differential signal depicted in FIG. 2.

When inducing a signal onto the bus 12, a suitable current is passed through the coil 30 by means of the leads 32, in the usual manner. This produces a signal in the wire 14 having the approximate waveform 50, shown in FIG. 2, and a signal in the wire 16 having the approximate waveform 52. When combined, they can be depicted as shown in FIG. 3. These waveforms 50 and 52 are, ideally, exactly opposite to each other, each having a similar magnitude but in an opposite direction. Such differentially generated signals are said to be self canceling by virtue of transmission line effects and therefore do not radiate from the bus 12 to surrounding areas. While it is desirable to obtain the exact symmetry of the two waveforms 50 and 52, as shown in FIGS. 2 and 3, it is not always possible to do so for a number of reasons. For example, the signal impressed upon the leads 32 for driving the magnetic core 10 may be asymmetric or the positioning of the wires 14 and 16 within the core 10 could vary slightly. The two halves 18 and 20 of the core 10 may be displaced slightly or misaligned so that an air gap exists between the abutting surfaces of one of the legs. Additionally, physical dimensions of the core 10 may vary or the composition of the material may lack homogeneity. Typically such cores are made of a ferrite material such as, in the present example, a ferromagnetic compound designated as number 813E187-3C8 that is manufactured by Ferroxcube, a division of Amperex Electronic Corp., 5083 Kings Highway, Saugerties, N.Y. 12477. This material is a manganese zinc ferrite having an initial relative permeability of 2700, which was found to be suitable. An important requirement of such material is that it provide a good path for magnetic flux.

Figure 4:
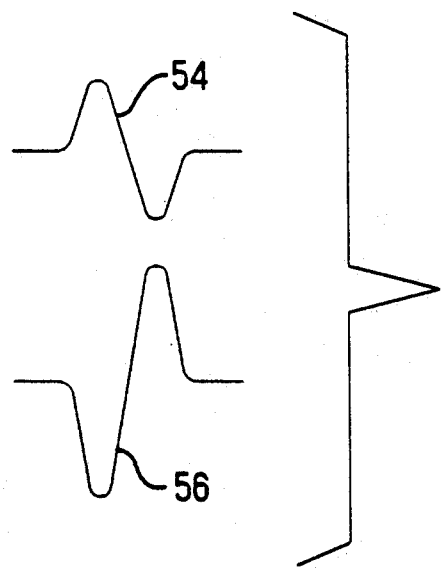
FIG. 4 is a graph similar to that of FIG. 2 showing typical waveforms affected by common mode energy.
Figure 5:
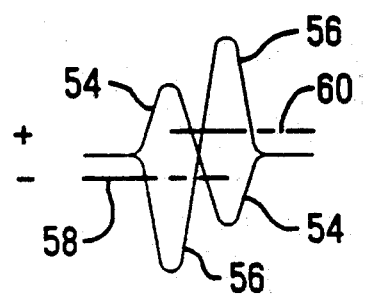
FIG. 5 is a graph similar to that of FIG. 3 combining the waveforms of FIG. 4.
Figure 6:
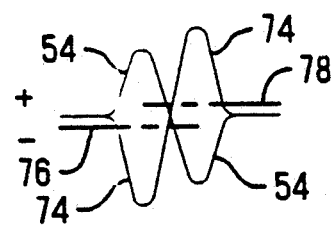
FIG. 6 is a graph similar to that of FIG. 5 showing the effects of attenuation on the common mode energy.
Figure 7:
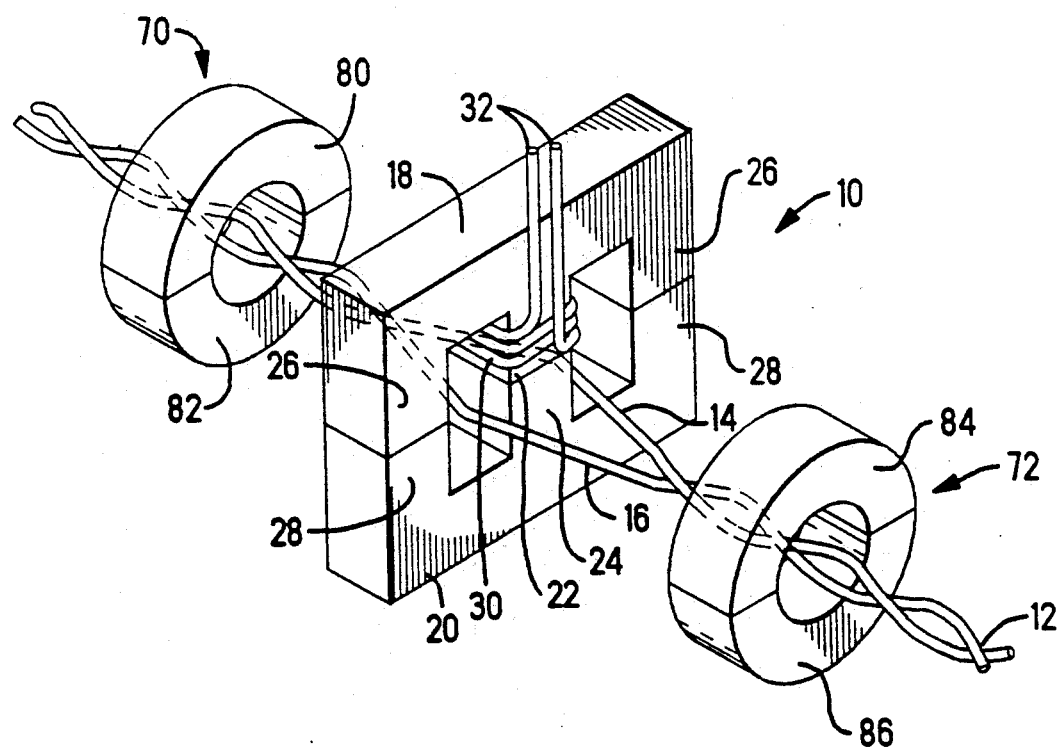
FIG. 7 is an isometric view showing the relationship of various elements of the connector of the present invention with respect to a two wire bus.

When exact symmetry of the two waveforms 50 and 52 is not possible, an imbalance results as is shown by the waveforms 54 and 56 in FIGS. 4 and 5. Note that when combined, as best seen in FIG. 5, the sum 58 of the first halves of the waveforms 54 and 56 has a negative displacement, and the sum 60 of the second halves has a positive displacement. These negative and positive displacements occur at the frequency of the primary signal being imposed upon the bus 12 by the core 10 which, in the present example, is about six megahertz (6 Mh). Therefore, a common mode 6 Mh signal having an amplitude equal to the negative and positive displacements 58 and 60 is created on the bus 12 and is free to radiate into the surrounding space. To reduce the magnitude of these negative and positive displacements 58 and 60, a pair of toroid shaped magnetic members 70 and 72 are arranged, one on each side of the core 10, as shown in FIG. 7. The members 70 and 72 are arranged so that the bus 12 passes very nearly through their respective centers. The members 70 and 72 operate on the common mode signal by attenuation and should be made from a ferrite material having a high resistance at the frequency of the primary signal being induced on the bus 12 by the core 10. In the present example a ferromagnetic compound designated as number 44 material is used and is manufactured by Fair-Rite Products Corp., One Commercial Row, Wallkill, N.Y. 12589. This material exhibits a relatively high resistance at 6 Mh, the primary signal frequency in the present example. This high resistance tends to absorb some of the energy from the portion of the signal having the higher absolute magnitude. In the case of the waveforms 54 and 56 depicted in FIGS. 4 and 5, the waveform 56 has the larger amplitude in both the negative half of the cycle and the positive half. Therefore the high resistance of the members 70 and 72 absorb energy from the portion of the signal represented by the waveform 56 causing a new signal portion having a waveform 74, shown in FIG. 6 in combination with the unaffected signal portion depicted by the waveform 54. Note that the net result is a much smaller negative and positive displacement 76 and 78 respectively. This new common mode 6 Mh signal having a much smaller amplitude is less likely to pose a problem to nearby electronic equipment than would be the case if the members 70 and 72 were not present.

Alternatively, the members 70 and 72 may be made to operate on the common mode energy by reflection and should be made of a ferromagnetic compound having inductive characteristics that would reflect energy from the portion of the signal represented by the waveform 56 and would again result in the new signal portion having the waveform 74. In this case the reflected energy would remain within the connector being repeatedly reflected between the two members 70 and 72 until dissipated by being converted into heat. A suitable material for this purpose would be material number 43 manufactured by Fair-Rite Products Corp.

Figure 8:
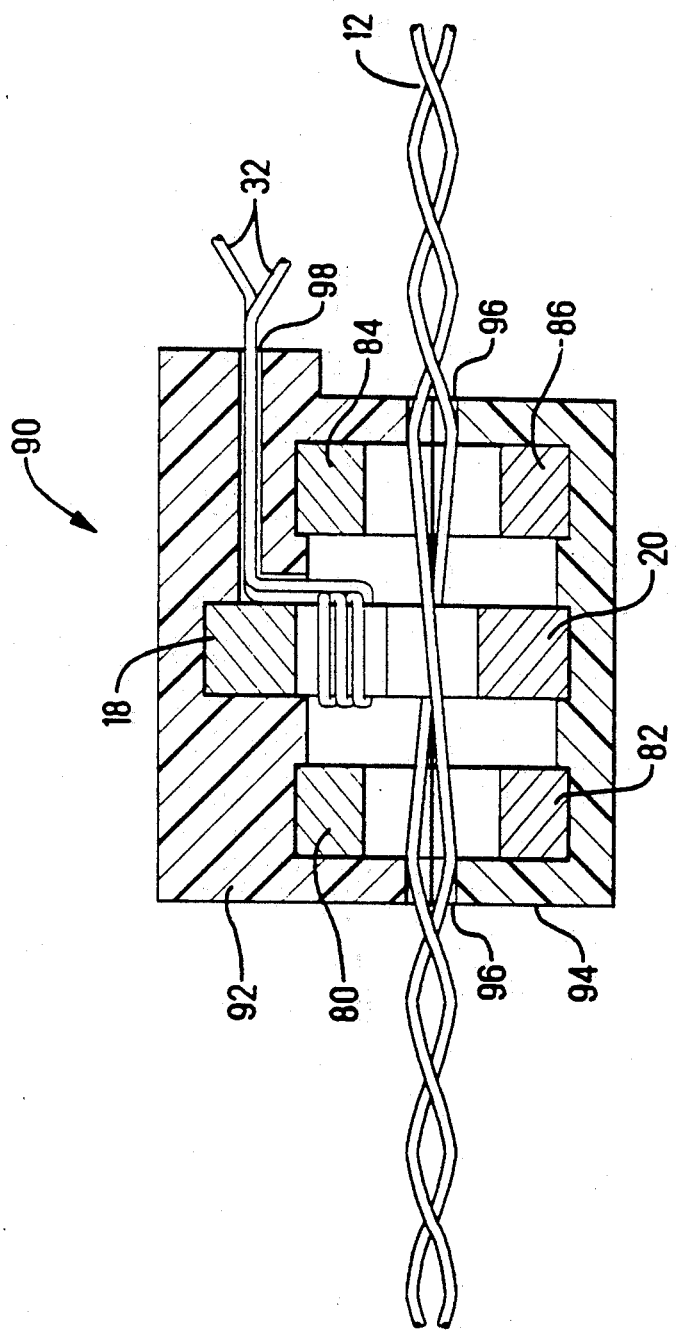
FIG. 8 is a cross-sectional view of a connector incorporating the teachings of the present invention.

As is shown in FIGS. 7 and 8 the magnetic core 10 is composed of two E shaped halves 18 and 20, as described above. Similarly, the members 70 and 72 are composed of two C shaped halves 80, 82 and 84, 86 respectively. A complete connector 90 is shown in FIG. 8 in magnetic coupling relationship with the two wire twisted pair bus 12. The connector 90 includes an insulating housing having two mating halves 92 and 94 similar to that disclosed in the '341 application referenced above. The housing half 92 contains the E shaped core 18 and the two C shaped halves 80 and 84 while the housing half 94 contains the E shaped core 20 and the two C shaped halves 82 and 86, each being permanently retained within its respective housing half by any suitable means. When the two housing halves 92 and 94 are mated, the two cores 18 and 20 mate to form closed magnetic paths along all three legs and the C-shaped halves 80 and 82 mate to form a toroid shaped member having a closed circular magnetic path. The C-shaped halves 84 and 86 mate in a similar way. There are suitable openings 96 formed in the housing halves 92 and 94 to provide a continuous passageway for the bus 12 and to align the bus substantially in the center of the members 70 and 72. An additional opening 98 is provided in the housing half 92 for passage of the leads 32 which are electrically connected to equipment, not shown, for inducing signals onto the bus 12 and for sensing such signals on the bus. If desired, the insulated housing halves 92 and 94 may be plated on their surfaces with a non-magnetic metal to suppress radiation of common mode signals generated within the connector 90. Alternatively, the housing halves may be made of such a non-magnetic metal as long as the metal does not interfere with the magnetic coupling characteristics of the core 10 and the members 70 and 72 with the bus 12.

It will be understood that the members 70 and 72 may take forms other than toroidal such as, for example, oval or U-shaped in cross section. In the case of a U-shaped member 70 or 72, the halves 80, 82 and 84, 86 may be either U-shaped or one of each pair may be U-shaped while the other of the pair is an I section. Other such shapes for both the magnetic core 10 and the magnetic members 70 and 72 will become apparent to the skilled art worker and are considered within the spirit and scope of the present invention. While the present invention is described in terms of a two wire bus, it will be understood that this is by way of example only and that the present invention may be advantageously practiced with multi-wire bus systems having more than two wires.

An important advantage of the present invention is that common mode energy impressed on the bus and having a frequency substantially the same as or approximately equal to the frequency of the primary signal appearing on the bus is substantially reduced without adversely affecting the primary signal.

I claim:

1. A connector for magnetically coupling to a multi-wire bus to differentially induce signals on said bus and to sense such signals on said bus, where the common mode energy impressed on said bus is substantially reduced without adversely affecting said signals, said connector comprising:

(a) induction means in coupling relation with said bus for inducing and sensing said signals, said means includes a magnetic core in differentially coupling relationship with two of the wires of said multi-wire bus, and (b) attenuation means in coupling relation with said bus for operating on only common mode energy having a frequency about equal to or approximately the same as that of said induced and sensed signals, said attenuation means further including two magnetic members each of which is arranged to surround said multi-wire bus on opposite sides of said magnetic core of said induction means, and including a non-magnetic housing for holding said magnetic core and said two magnetic members in mutually spaced relation with respect to said multi-wire bus, wherein said magnetic core of each of said magnetic members each comprise two parts, and said housing comprises two halves each of which contain one of said parts of said magnetic core and one of said parts of each of said magnetic members, and arranged so that when said housing halves are apart said multi-wire bus can be positioned within said parts of said magnetic core and said magnetic members so that when said housing halves are together said magnetic core is in said coupling relation with said bus and said two magnetic members are in said coupling relation with said bus.

2. The connector according to claim 1, wherein each of said magnetic members is of toroid shape and being in two parts neither of which individually form a toroid.

3. The connector according to claim 1 wherein said attenuation means exhibits a relatively high resistance at a frequency substantially the same as that of said differentially induced signals so that said attenuation means absorbs a portion of said common mode energy.

4. The connector according to claim 1 wherein said attenuation means exhibits a relatively high inductance at a frequency substantially the same as that of said differentially induced signals so that said attenuation means reflects a portion of said common mode energy in a direction toward said induction means.

5. The connector according to claim 1 wherein said multi-wire bus comprises a two wire twisted pair and said magnetic core is in approximate surrounding relationship with each individual wire of said two wire twisted pair.

* * * * *